D. R. OLIVER.
AIR MOTOR.
APPLICATION FILED NOV. 11, 1918.

1,345,022.

Patented June 29, 1920.

INVENTOR
Dew R. Oliver

Townsend
ATTORNEYS

UNITED STATES PATENT OFFICE.

DEW R. OLIVER, OF SAN FRANCISCO, CALIFORNIA.

AIR-MOTOR.

1,345,022.  Specification of Letters Patent.  Patented June 29, 1920.

Application filed November 11, 1918. Serial No. 262,005.

*To all whom it may concern:*

Be it known that I, DEW R. OLIVER, a citizen of the United States, residing at San Francisco, in the county of San Francisco and State of California, have invented new and useful Improvements in Air-Motors, of which the following is a specification.

This invention relates to a power generator and particularly pertains to an air motor. It is the principal object of this invention to provide an air motor adapted to be affected by the wind and which will act to economically employ the force generated by a wind within which the device is exposed, to obtain a maximum amount of power therefrom. The present invention contemplates the use of a tubular body member disposed to swing in a horizontal plane and within which a plurality of propellers are fixed upon a single shaft to be driven by air entering through an enlarged induction mouth at one end of the tube and passing out through a funnel-shaped eduction opening at the opposite end thereof, said induction member being fitted with means for automatically regulating the volume of air passing to the propellers.

The invention is illustrated by way of example in the accompanying drawings, in which—

Figure 1:
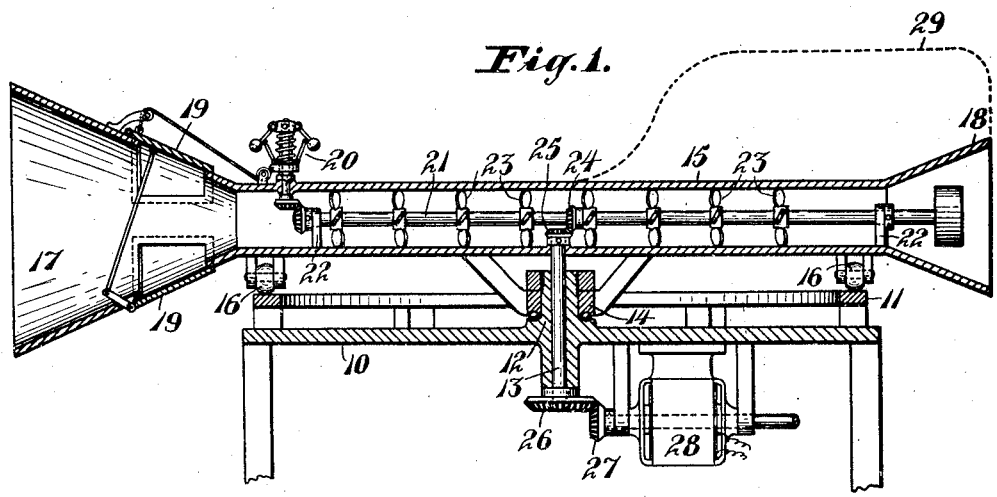
Figure 1 is a view in longitudinal vertical section, disclosing the complete operating mechanism.
Figure 2:
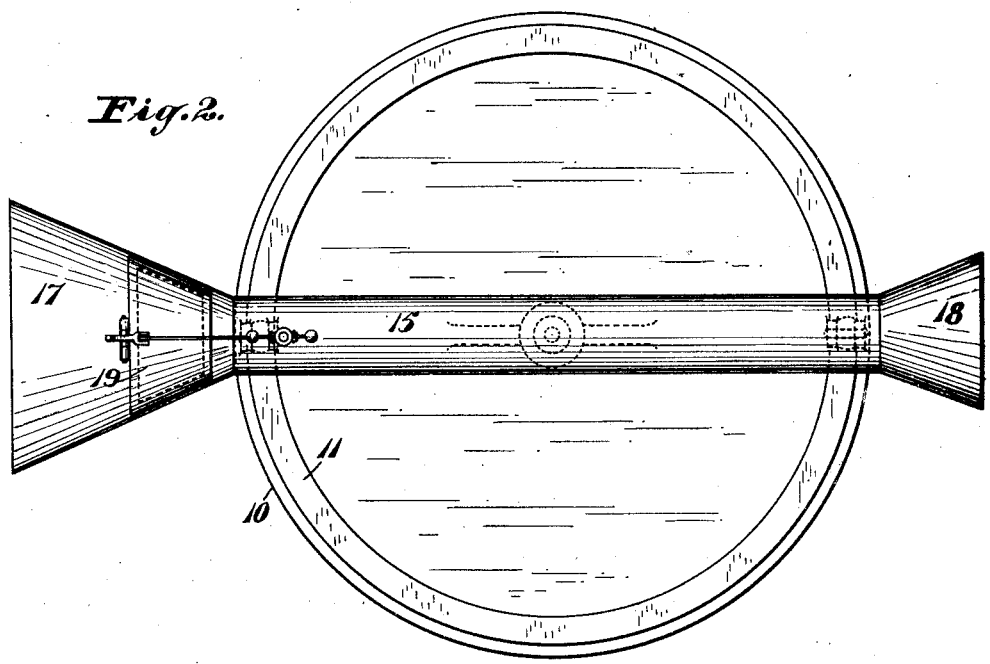
Fig. 2 is a view in plan more clearly illustrating the turn-table upon which the apparatus may be moved to present it to the action of an air current.

Referring more particularly to the drawings, 10 indicates a turn-table upon which is mounted a circular track 11. Disposed concentrically of this turn-table is a vertical bearing 12, through which a drive shaft 13 is positioned. The upper portion of this bearing is provided as a central axis for a hub 14 of an air motor. This hub is fixed beneath the tubular body member 15 of this air motor, said body member extending horizontally over the turn-table and being provided with roller wheels 16 near its opposite outer ends to carry it upon the track 11. It will thus be seen that the tubular member 15 may rotate in a plane parallel to the track 11 and that it will be properly supported against distortion, due to the provision of the rollers 16. The induction end of the tube 15 is formed with a large funnel-shaped mouth 17 into which the wind may pass through the central cylindrical opening through the tube. The eduction end of the tube is formed with another bell-shaped mouth 18 from which the air may pass, after having passed the length of the tube.

In order to regulate the volume of air passing to the tube, a series of shutters 19 are mounted over openings formed in the side walls of the mouth 17. These shutters are appropriately provided with a link mechanism connected with a governor 20, the rotation of which will regulate their action to provide a by-pass of air when an excessive speed of rotation has been attained by a drive shaft 21. This drive shaft extends through the tube 15 and concentric therewith. A plurality of bearings 22 are provided along this shaft to rotatably support it while a series of propellers 23 are fixed to the shaft at desired intervals, to be affected by the wind passing along the tube and thus drive the shaft. A beveled gear 24 is fixed near the center of the shaft and is in mesh with a complementary gear 25. This last named gear is secured to the upper end of the drive shaft 13 and as this shaft is concentric with the pivotal axis of the wind-mill, it will be driven irrespective of the angular position of the tube upon the turn-table. A beveled gear 26 is fixed to the lower end of shaft 13 and in mesh with a complementary gear 27. The gear 27 is here shown as driving an electric generator 28 although it will be understood that the power developed by the motor may be used for any purpose desired.

In operation, the turn-table 10 is disposed upon any suitable support and the tube 15 pivotally mounted thereon to swing throughout a horizontal plane. A vane 29 may be mounted upon the tube to insure that it will stand parallel to the path of travel of the wind. As the air passes in through the bell-shaped mouth 17, it will forcibly enter the tube 15 and there effect the various propellers 23 to rotate the shaft. This rotation will be imparted to the drive shaft 13 and may be thereafter utilized, if desired. When excessive speeds of rotation are attained by the shaft 21, the governor 20 is actuated to open the shutters 19 and allow a by-pass of the incoming air. The outgoing air from the tube will not pass directly from the small orifice at the end of the tube 15 but will be gradually admitted to the air by reason of the enlarged mouth member 18. Thus, it is contended that there will be no back pressure in the mechanism.

It will thus be seen that the device here disclosed, while simple in construction and composed of few parts, will act effectively to produce a maximum of power as attained by the wind.

Having thus described my invention, what I claim and desire to secure by Letters Patent is—

A wind regulated motor consisting of a horizontally supported tube mounted to be turnable about a vertical axis and having divergent inlet and exit ends, a shaft journaled centrally in the tube with a series of propellers fixed to it at intervals of its length and driven by the air blast passing through the tube, the divergent inlet mouth having openings around its sides and shutters hinged and connected to control the movements of the shutters, a governor driven by the propeller shaft, and connections by which variations in the speed of the shaft will be communicated to open or close the shutters and allow a proportionate amount of air to escape from the inlet funnel without entering the propeller tube.

In testimony whereof I have hereunto set my hand in the presence of two subscribing witnesses.

DEW R. OLIVER.

Witnesses:
FRANK E. COVEY,
JOHN H. HERRING.